United States Patent Office 3,519,457
Patented July 7, 1970

3,519,457
TREATMENT OF INGOT MOULDS
Roderic H. Hammerton and Anthony C. Wardell, both of 285 Long Acre, Nechells, Birmingham 7, England
No Drawing. Filed Dec. 29, 1966, Ser. No. 605,619
Claims priority, application Great Britain, Dec. 30, 1965, 55,241/65
Int. Cl. B28b 7/36, 7/38
U.S. Cl. 117—5.3      3 Claims

ABSTRACT OF THE DISCLOSURE

A process for treating the bottom of ingot moulds with a dry layer of a composition comprising a finally divided refractory material and both solid and liquid thermosettable or chemically hardenable synthetic resins. The layer is heated to bond the powder onto the bottom plate. Such a coating minimizes normal damage resulting from impacting streams of molten metals.

---

This invention relates to the treatment of the base or bottom plate of an ingot mould with a refractory dressing thereby to provide a protective coating thereon.

Ingot moulds usually have tapered walls and accordingly as the wider end is at the top or bottom of the mould are referred to as wide-end-up or wide-end-down moulds. In the case of wide-end-up moulds the base of the mould is usually integral with its sides and the ingot is removed from the mould by simply lifting it out of the mould. With wide-end-down moulds this is not practicable and accordingly such moulds are commonly constructed of a casing constituting the walls of the mould resting on a bottom plate or so-called "stool." Stripping of the ingot is then achieved by lifting away the casing, leaving the ingot standing on the bottom plate.

In either form of mould the molten metal, e.g. steel, is commonly poured in from the top and thus impacts the base or bottom plate of the mould. The impact of the hot metal on the base or bottom plate erodes it so that eventually the mould, if it has an integral base, has to be discarded, or the bottom plate has to be replaced. It is an object of the present invention to provide a method whereby, by means of a protective coating, the erosion of the base or bottom plate of an ingot mould may be decreased and its life accordingly prolonged.

According to the present invention there is provided a process for the treatment of the base or bottom plate of an ingot mould which comprises applying thereto a layer of a dry powdered composition comprising a finely divided refractory material and a thermosettable or chemically hardenable synthetic resin.

In a particular and preferred form of the invention the synthetic resin is a liquid thermosettable synthetic resin which is absorbed in, or becomes a coating on, the particles of finely divided refractory material. In effecting the admixture of the refractory material and the liquid synthetic resin a composition which is originally pasty becomes crumbly and finally is obtained as a dry powder, possibly due either to the absorption or adsorption of the liquid in the refractory particles or possibly due to a change of state of the liquid resin during the mixing operation. The conversion from pasty to dry powder composition may be assisted by mild heating, e.g. by employing warm particles of the refractory material.

The synthetic resin employed may be a chemically hardenable resin such as epoxy, polyester, aminoplast (e.g. ureaformaldehyde melamine formaldehyde), silicone or furane resins. Thermosetting resins which may be employed include phenol-formaldehyde and phenol-furfuraldehyde resins.

It is frequently advantageous to employ as the synthetic resin both a liquid thermosettable synthetic resin and a solid thermosettable synthetic resin, the latter as fine particles. A preferred resin combination is one formed of liquid phenol formaldehyde resin and powdered phenol formaldehyde resin and the invention will now be described with especial reference to that case.

It is important that, since the impact of the molten metal will tend to burn the resinous constituents of the protective coating that the coating should be formulated so that it yields only a minimum amount of fume. It is also important that the coating should adhere very strongly to the base or bottom plate. Bearing these considerations in mind it is preferred to employ, for the process of the present invention an admixture of finely divided refractory material, liquid phenol-formaldehyde resin and powdered phenol-formaldehyde resin in such proportions that the weight ratio of liquid to powdered solid phenol-formaldehyde resin is within the range of 1:1 to 1:4 preferably substantially 1:2, and that the total resins content of the composition is from 3% to 40% by weight.

The refractory material used may be any of those commonly known for use in the foundry and steel-making industries, examples being sand, dolomite, chamotte, olivine, sillimanite, magnesia, grog, zircon, alumina or alumino-silicates. It is preferable that its particle size should be such that the bulk of it will pass a 10 BSS Mesh and preferably such that the bulk of it will pass a 22 BSS Mesh. It is also advantageous, in order to facilitate "packing" of the refractory particles, that it should comprise a range of particle sizes. Thus for example, one refractory material which has proved very suitable is crushed chamotte (dead burned alumina firebrick) having the following sieve analysis (BSS meshes referred to):

| Mesh | Percent |
|---|---|
| +10 | Nil |
| −10+22 | 1–5 |
| −22+44 | 25–30 |
| −40+60 | 15–20 |
| −60+100 | 10–15 |
| −100+200 | 15–20 |
| −200 | 15–20 |

The phenol-formaldehyde resins used are known materials per se. In the preferred proportions indicated the composition may be formulated as a dry powder.

It is generally preferable to apply the mixture to the base of bottom plate of the ingot mould in the dry powder form referred to and to fuse it to a more or less even coating. This may be accomplished most conveniently by the effect of the residual heat in the base or bottom plate from its previous use or by preheating the base or bottom plate, e.g. to a temperature of 130° C. or more, and usually at least 180° C. The quantity applied will vary from case to case but will ordinarily be of a thickness of one-sixteenth to one-eighth of an inch.

In a modification of the invention the dry powder mixture may be compacted to the form of a sheet of convenient thickness and applied as such to the base or bottom plate of the mould.

The method of the invention generally, and the use of the preferred compositions more particularly, gives rise to considerable advantages over the prior art procedures which have generally used suspensions of refractory solid in liquid media. The powder compositions used in accordance with the present invention are simple to apply and clean in use and require no special equipment for their application. Moreover their use avoids the disadvantages common with liquid-based dressings (e.g. sedimentation of the suspended material and bacterial attack).

Moreover the coatings obtained by the process of the invention have been found to have a high resistance to thermal shock and to provide excellent protection against erosion.

As an ancillary advantage, if the coating is only partially cured on a base plate before the mould is lowered onto it and is then fully cured, the composition provides an excellent seal between the mould and base plate.

The invention includes the method described above and also comopsitions for use in carrying out the method. Specifically the invention includes, as a new product, a dry powder composition consisting essentially of a mixture of finely divided refractory material, liquid phenol-formaldehyde resin and powdered phenol-formaldehyde resin in such proportions that the weight ratio of liquid to powdered phenol-formaldehyde resin is within the range of 1:1 to 1:4 preferably substantially 1:2, and that the total content of resin in the admixture is from 3% to 40% by weight.

We claim as our invention:

1. A process for the treatment of the base or bottom plate of an ingot mould which comprises applying thereto a layer of a composition comprising a finely divided refractory material, a solid thermosettable or chemically hardenable synthetic resin and a liquid thermosettable or chemically hardenable synthetic resin where the total resin content of the composition is 3% to 40% by weight and the weight ratio of liquid resin to solid resin is within the range of from about 1:1 to about 1:4, where said ingredients are present in relative proportions such that the composition is a dry powder, the layer being at least one-sixteenth of an inch thick, and heating the said layer to a temperature of at least 130° C. to bond the powder into a coherent layer on the base or bottom plate.

2. A process according to claim 1 wherein the synthetic resins are selected from the group consisting of phenol-formaldehyde, phenol-furfuraldehyde, epoxy, polyester, aminoplast, silicone and furane resins.

3. A process according to claim 1 wherein the refractory material is a member selected from the group consisting of sand, dolomite, chamotte, olivine, sillimanite, magnesia, grog, zircon, alumina and aluminosilicates.

References Cited

UNITED STATES PATENTS

| | | | |
|---|---|---|---|
| 2,234,152 | 3/1941 | Archer | 117—5.3 |
| 3,037,873 | 6/1962 | Ingala | 117—5.3 |
| 3,047,917 | 8/1962 | McCarter et al. | 117—5.3 |
| 3,056,692 | 10/1962 | Kitada | 117—5.3 |
| 3,120,684 | 2/1964 | Gathmann | 117—5.3 |
| 3,184,815 | 5/1965 | Reuter | 117—5.3 |
| 3,396,935 | 8/1968 | Snyder | 117—5.3 |

FOREIGN PATENTS

| | | |
|---|---|---|
| 1,011,220 | 11/1965 | Great Britain. |
| 567,031 | 12/1958 | Canada. |

WILLIAM D. MARTIN, Primary Examiner

R. M. SPEER, Assistant Examiner

U.S. Cl. X.R.

117—21